United States Patent Office 2,699,013
Patented Jan. 11, 1955

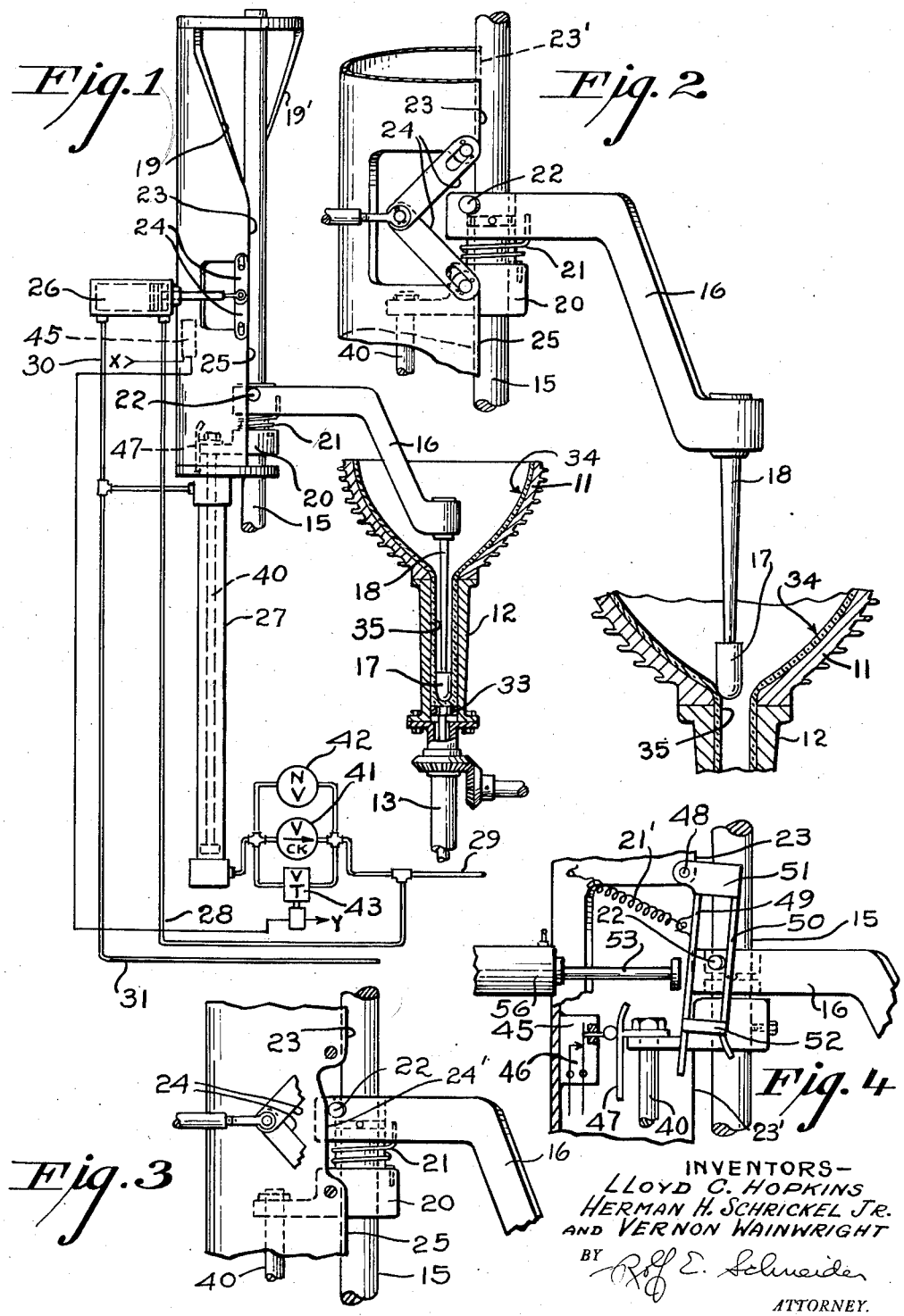

2,699,013

APPARATUS FOR AND METHOD OF FORMING GLASS ARTICLES HAVING FUNNEL-TUBE CONFIGURATION

Lloyd C. Hopkins, Herman H. Schrickel, Jr., and Vernon L. Wainwright, Corning, N. Y., assignors to Corning Glass Works, Corning, N. Y., a corporation of New York Application January 12, 1953, Serial No. 330,857

16 Claims. (Cl. 49—29)

The present invention relates to the fabrication of tubulated glass articles such as funnel-tubes and television tube blanks of funnel-tube configuration, and may be considered as an improvement on the method and apparatus disclosed in co-pending application Serial No. 107,945 filed August 1, 1949, now Patent No. 2,662,346.

In accordance with the invention described in the aforesaid application, a tubulated glass article can be produced as an integral unit in a single operation by fabricating the article with the aid of centrifugal action. In the practice of that invention, a charge of molten glass is deposited in a hollow mold provided with a tubular portion, and the mold is rotated about the axis of its tubular portion to centrifugally distribute molten glass over the walls thereof. Advantageously the mold is arranged with its tubular portion vertical, and the glass charge is initially positioned over the mouth of the tubular portion. A differential pressure, preferably obtained at least in part by the creation of a negative pressure within the tubular portion, is ordinarily applied to the glass charge to force a controlled amount of molten glass into the tubular portion for formation of the desired tubulation. A glass-working tool referred to as a distributor is advantageously also introduced into the tubular portion to effect annular extrusion and distribution of the glass forced thereinto desirably in cooperation with a valve which occupies such tubular portion and is so withdrawn as to subject the glass during its advancement therethrough to a yieldingly opposing pressure.

Funnel-tubes for use in the production of television picture tube envelopes require careful control of wall thickness in the area of juncture of the funnel and its tubulation, since if the wall thickness in such area becomes excessive, the electron beam clearance will be inadequate. While funnel-tubes satisfactory for such purpose can be produced by the procedure described in the referred-to co-pending application, particularly when the tubulations are of larger diameter, such operation requires excessive care and also requires that low viscosity glass be delivered to the mold and that the mold be rotated at the necessary speed to stretch or thin out the glass in the funnel-tubulation junction area entirely by centrifugal action as required for proper beam clearance. This technique becomes more difficult as tubulation diameters are reduced. Provision can readily be made for obtaining the necessary mold speed to attain this object for a given glass viscosity, but the continued maintenance of the required glass viscosity is more difficult and presents a greater problem. In co-pending applications Serial Nos. 270,646 and 270,647 filed February 8, 1952, various methods and/or apparatus are taught of alleviating this difficulty.

According to the present invention, this difficulty can be substantially mitigated and a greater latitude of glass viscosity variation can be tolerated by utilization of the distributor as it is being returned to its initial position as a sizing or marvering tool for sufficiently thinning the funnel-tubulation junction wall area while the funnel-tube is still being rotated and while the glass in such area is still soft.

The prime object of the invention therefore is to provide an improved method of and apparatus for marvering the area of junction of the funnel portion and the tubular portion of a funnel-tube for the purposes hereinbefore set forth immediately after its centrifugal formation and while the glass thereof is still workable.

In the accompanying drawing

Fig. 1 is a sectional elevation of a mold and of a funnel-tube therein showing a distributor advanced into the tubulation thereof. The figure also shows a distributor operating mechanism embodying the invention.

Fig. 2 is a fragmentary view, on an enlarged scale, similar to Fig. 1, showing the distributor along the portion of its return path of travel at which it is in marvering relation with the article wall.

Fig. 3 is a view of a fragment of the apparatus of Figs. 1 and 2 illustrating an alternative track arrangement.

Fig. 4 is a view similar to Fig. 2 illustrating a further alternative arrangement of the invention.

Referring to the drawing in detail, a mold 11 having a tubular portion 12 is illustrated as adapted for rotation about its vertical axis by means of a suitably driven supporting shaft 13.

Arranged alongside mold 11 is a vertically positioned column 15 upon which is slidably arranged a support or arm 16 having suspended from its free end a shaft 18 carrying at its bottom end a distributor 17. A spring 21 wound about column 15 and anchored at one end to arm 16 and at the other end to a bracket 20 constantly urges arm 16 to turn in a counterclockwise direction, or laterally with respect to the mold. Turning movement of arm 16 against the tension of spring 21 is determined by the contour of the cam track made up of sections 19, 23, 24 and 25 engaged by a roller 22 on arm 16. As illustrated in Fig. 1, track section 19 guides arm 16 into axial alignment with the tubular portion 12 of mold 11, and such alignment is maintained by track sections 23, 24 and 25 except as hereinafter more fully described. Bracket 20 is secured to the top end of an actuator rod 40 by means of which the distributor 17 may be moved into and out of the bore of the tubular portion 12 of the mold to form a tubular article by annular extrusion of glass in cooperation with retractable valve 33, as fully taught in said application Serial No. 107,945.

In accordance with the form of the invention illustrated in Figs. 1, 2 and 3, the track section 24 is retractable to the position in which it is shown in Fig. 2, by a hydraulic unit 26 whose right hand end, as viewed in the drawing, is supplied with operating fluid for this purpose from a branch 28 of a line 29 which supplies fluid to the lower end of the hydraulic unit 27 to raise the distributor 17 to its initial position above and laterally displaced from the mold in the manner taught in said application Serial No. 107,945. The track section 24 is restored to the position in which it is shown in Fig. 1 by fluid supplied to the left end of the unit 26 from a branch 30 of a line 31 which supplies fluid to the upper end of unit 27 to lower the distributor into the position in which it is shown in Fig. 1.

In order that there be a minimum delay between the time of formation of the article and the time during which the marvering operation is performed, it is desirable that the distributor be quickly returned to the height in the mold tubulation at which the marvering operation is to begin. On the other hand, it is essential for the proper carrying out of the marvering operation that the return travel of the distributor be relatively slow while such operation is being performed. These operating characteristics are attained by placing a check valve 41 in that portion of line 29 between its junction with line 28 and its connection to the lower end of hydraulic unit 27, by bridging a needle valve 42 and a normally open magnetically operable flow control valve 43 around such check valve and by energizing the magnet of the flow control valve only during the time the distributor is passing through the portion of the article to be marvered. The operating circuit for valve 43 is arranged for closure during such movement of the distributor over a circuit extending from terminal X of a suitable current source through the normally open contacts 46 (Fig. 4) of a switch 45 actuated by a cam 47 attached to the upper end of the actuator rod 40 of unit 27, such cam engaging said switch at the time of commencement of the marvering operation and being of a length corresponding to the distance of travel of the distributor while performing such marvering operation.

The operation may be briefly summarized as follows:
A funnel-tube, such as 34 is centrifugally formed in mold 11 in the general manner taught in application Serial No. 107,945. During formation of the funnel-tube the distributor is lowered into the tubular portion 12 of the mold to aid in the formation of tubulation 35 from a charge of molten glass previously deposited in the mold 11. During such lowering movement of the distributor 17, the switch 45 closes its contacts 46 and effects operation of valve 43 while the distributor is passing through the area of junction of the mold funnel and its tubular portion, but without effect on the operation of unit 27 since the fluid flow path to line 29 remains wide open through the check valve 41. Subsequently, as the hydraulic unit 27 is supplied with fluid at its lower end to restore the distributor to its initial position, fluid is also supplied to the right hand end of unit 26 so that the track section 24 is retracted and therefore when roller 22 passes off the end of track section 25 permits the arm 16 to turn under the influence of spring 21 until stopped by the engagement of the distributor with the inner surface of the funnel-tube wall until moved clear thereof by subsequent engagement of roller 22 with the upper segment of track section 24 and subsequently the adjoining end of track section 23. Since the mold 11 is still rotating as the distributor is being restored and since the distributor is bearing against the glass under the influence of spring 21, the still plastic glass is progressively marvered from the level at which the distributor initially engages the funnel-tube upwardly and outwardly until the roller 22 engages the upper segment of track section 24. Additionally, when the distributor reaches the level at which the roller 22 leaves the track section 25, cam 47 engages and operates switch 45, thus closing the circuit for valve 43 to thereafter restrict the rate of upward travel of the distributor to that permitted by needle valve 42 until the distributor actuator rod 40 has been raised sufficiently to effect disengagement of cam 47 from such switch.

As illustrated in Fig. 3, if desired, the track sections 23 and 25 may be also bridged by a track section 24' with such latter track section contoured to limit the lateral movement of the distributor to restrict its marvering action to not to exceed a predetermined value rather than as in the structures of Figs. 1 and 2, relying on the amount of spring tension and the softness of the glass to determine the extent of the marvering operation.

As pointed out in the description of the forms of the invention disclosed in Figs. 1 to 3, the spring 21 at all times tends to turn the distributor arm toward a lateral position with respect to the tube axis of the mold 11. It should be pointed out, however, that the member having track sections 19 and 25 also has formed thereon a track section 19' and section 23' extending downwardly therefrom and which are equivalent to track sections 19, 23, 25 and section 24 in its normal position, and that track sections 19' and 23' are engaged by a roller (not shown) similar to 22 projected from the opposite side of arm 16. Spring 21 accordingly is not relied upon to maintain the distributor along the path afforded by track sections 19, 23, 24 and 25.

In the form of the invention shown in Fig. 4 the track section 23 and the track section corresponding to 25 (not shown) are normally bridged by a box cam pivoted at 48 and comprising cam elements 49 and 50 bridged by suitable supporting transverse members 51 and 52. The cam element 49 functions in the same manner as does track section 24 and is normally held in alignment with track section 23 against the tension of a spring 21' by a push rod 53 of a hydraulic unit 56 interchangeable with the hydraulic unit 26. Cam element 50 on the other hand is adapted to bear against roller 22 under the tension of spring 21' to effect the marvering operation at such times that the push rod 53 is in its retracted position.

The primary difference between the first and last described forms of the invention therefore resides in the fact that whereas spring 21 at all times applies a turning force to the arm 16, spring 21' only does so at such time that the marvering operation is taking place.

What is claimed is:

1. A glass-forming apparatus which includes a mold having a cavity of generally funnel-tube configuration, means rotatably supporting said mold with the funnel portion arranged uppermost, means for rotating said mold about the tube portion axis to distribute glass from a molten charge deposited within said mold cavity over the wall thereof, a tool associated with said mold, means for moving said tool through the funnel portion of the mold cavity into and along the tube portion thereof and for returning said tool to its initial position, and means for affording a return path for said tool that brings it into working engagement with the glass distributed over the area of junction of the funnel and tube portions of the mold cavity wall as such tool passes therealong.

2. A glass-forming apparatus which includes a mold having a cavity of generally funnel-tube configuration, means rotatably supporting said mold with the funnel portion arranged uppermost, means for rotating said mold about the tube portion axis to distribute glass from a molten charge deposited within said mold cavity over the wall thereof, a tool associated with said mold, means for moving said tool through the funnel portion of the mold cavity into and along the tube portion thereof and for returning said tool to its initial position, means providing a path of movement for said tool into the tubular portion of said mold cavity in axial alignment therewith and means for so altering the return path for the tool that it is brought into working engagement with the glass distributed over the area of junction of the funnel and tube portions of the mold cavity wall.

3. The method which comprises supplying a charge of molten glass to the junction of the funnel-forming cavity and of the depending tube-forming cavity of a vertically disposed funnel-tube mold, rotating the mold about the tube cavity axis to concurrently centrifugally form a funnel upwardly from the charge in the funnel cavity against the action of gravity and a tube integral therewith downwardly from the charge in the tube cavity aided by gravity, engaging the tube with a tool to assist centrifugal action in formation of the tube and subsequently engaging the inner surface of the so formed funnel-tube with such tool progressively from a point below said junction to a point above said junction.

4. A glass-forming apparatus which includes a mold having a cavity of funnel-tube configuration, a tool for thrusting glass of a molten charge deposited in the funnel cavity portion of said mold into the tube cavity portion thereof and for subsequently marvering the inner surface area of that portion of a funnel-tube occupying such mold in the vicinity of the junction of the funnel and tubular portions thereof, means for rotating said mold about the funnel cavity axis to centrifugally distribute molten glass of the charge over the funnel-tube mold cavity walls, means providing different paths of movement for said tool into and out of said mold cavities for the purposes set forth, and means for moving said tool over such paths.

5. A glass-forming apparatus which includes a mold having a generally funnel-tube configuration, means rotatably supporting said mold with the funnel portion uppermost, means for rotating said mold about the tube portion axis to distribute glass from a charge thereof occupying the mold over the wall thereof, an associated glass working tool movable between a position above and laterally disposed with respect to said mold and a position within the tube portion thereof, a first means tending to move said tool laterally with respect to said mold, a second means affording a path of movement between such positions that maintains said tool in axial alignment with the tube cavity of said mold during movement of the tool in one direction through the junction area of its funnel and tube portions against the action of said first means, and means for so adjusting said second means that during movement of the tool in the reverse direction through such area said tool is moved laterally under the influence of said first means.

6. A forming apparatus such as defined by claim 5 which includes means for placing a limitation on the extent of lateral movement of the tool while passing through such area in such reverse direction.

7. A glass-forming apparatus which includes a mold having a cavity of generally funnel-tube configuration, means rotatably supporting said mold with the funnel portion uppermost, means for rotating said mold about the tube portion axis to distribute glass from a molten charge thereof occupying the mold over the wall thereof, an associated movable support, a glass working tool depending from said support and movable between a position above and laterally disposed with respect to said mold and a position within the tube portion thereof, a spring tensioned to tend to move said support and tool laterally with respect to said mold, a track engageable by said support under tension of said spring affording a path of lateral movement of said tool into and out of axial alignment with the tube portion of the mold and affording a path of movement for the tool into and out of such tube portion, said track having a section of its length engageable by said support while the tool is in the area of juncture of the funnel and tube portions of the mold and laterally movable in the direction which said spring tends to move said tool, means for moving said support back and forth along said track, and means for moving said track section out of the path of said support preceding movement of the tool through such area in a predetermined direction.

8. A glass-forming apparatus such as defined by claim 7 wherein a section of said track is bridged by said movable section and is engageable by said support only when the movable section has been moved from along the path of said support.

9. A glass-forming apparatus which includes a mold having a cavity of generally funnel-tube configuration, means rotatably supporting said mold with the funnel portion arranged uppermost, means for rotating said mold about the tube portion axis to distribute glass from a molten charge deposited within said mold cavity over the wall thereof, a tool associated with said mold, means for moving said tool through the funnel portion of the mold cavity into and along the tube portion thereof and for returning said tool to its initial position, means providing a path of movement for said tool that maintains it in axial alignment with the tube portion of the mold cavity during travel of the tool in one direction through the junction area of the funnel and tube portions thereof, and means for laterally displacing said tool during movement thereof in the reverse direction through such area.

10. A glass forming apparatus such as defined by claim 9 which includes means for varying the speed of travel of said tool during its movement in one direction through the funnel and tube portions of said mold cavity.

11. A glass forming apparatus such as defined by claim 9 wherein the means for moving the tool comprises a fluid operable unit and includes means for reducing the speed of operation thereof during movement of the tool through a predetermined portion of its path of travel in a selected direction.

12. A glass forming apparatus such as defined by claim 9 wherein the means for moving the tool comprises a fluid operable unit and includes a fluid line to one end thereof, means providing open restrictive and normally open non-restrictive parallel fluid paths respectively between such unit end and said fluid line, means for closing the latter fluid path to limit the rate of fluid supply to such end of the unit while the tool is laterally displaced and traveling through such area, and means providing a non-restrictive fluid path only from such end of the unit to such line whenever the tool is in axial alignment with the tube portion of such mold and traveling through such area.

13. A glass forming apparatus such as defined by claim 1 which includes means for reducing the speed of return movement of said tool as it approaches the area of junction of the funnel and tube portions of the mold.

14. A glass-forming apparatus which includes a mold having a cavity of generally funnel-tube configuration, means rotatably supporting said mold with the funnel portion arranged uppermost, means for rotating said mold about the tube portion axis to distribute glass from a molten charge deposited within said mold cavity over the wall thereof, a tool associated with said mold, means for moving said tool through the funnel portion of the mold cavity into and along the tube portion thereof and for returning said tool to its initial position, a first element for affording a path of travel for said tool that maintains it in axial alignment with the bore of the tube portion of the mold cavity as it is being moved thereinto, a second element for affording a return path of travel for said tool that brings it into marvering relation with the glass distributed over the mold cavity wall as such tool passes through the area of junction of the funnel and tube portions of the mold cavity and means for activating said elements for the purposes set forth.

15. A glass-forming apparatus which includes a mold having a cavity of generally funnel-tube configuration, means rotatably supporting said mold with the funnel portion arranged uppermost, means for rotating said mold about the tube portion axis to distribute glass from a molten charge deposited within said mold cavity over the wall thereof, a tool associated with said mold, means for moving said tool through the funnel portion of the mold cavity into the tube portion thereof and for returning said tool to its initial position, means affording different paths for said tool in its movement between such positions, said means including a cam movable between two alternative positions and having separate cam elements thereon one of said elements being adapted to guide the tool along a path in axial alignment with the tube portion of the mold cavity and the other being adapted to laterally displace the tool with respect to the axis of the tube portion of the mold cavity, means at all times tending to move said cam to a position to laterally displace said tool, and apparatus for disabling said latter means while said tool is passing through the area of junction of the funnel and tube portions of said mold cavity in a particular direction only.

16. In a glass working apparatus, a mold having a tubular portion, a glass working tool associated with said mold, means including a fluid operated unit for moving said tool between a position exterior to said mold to a position within its tubular portion, fluid lines to the ends of said unit for alternately effecting movement of the tool from one of its positions to the other, the line to one end of said unit having branches providing parallel fluid paths between such line and said unit one branch including a check valve positioned to prevent passage of fluid to the unit, a second branch providing a path to said unit including a valve restricting the rate of fluid flow between said line and the unit and a third branch providing a third path between said line and said unit including a magnetically closable valve, a circuit for said last valve including a switch and means for operating said switch while said unit is moving said tool over a particular portion of its path so as to energize said valve and thus prohibit the flow of fluid through such branch to restrict the rate of movement of the tool.

References Cited in the file of this patent

UNITED STATES PATENTS 1,859,957    Canfield    May 24, 1932